United States Patent Office 3,227,521
Patented Jan. 4, 1966

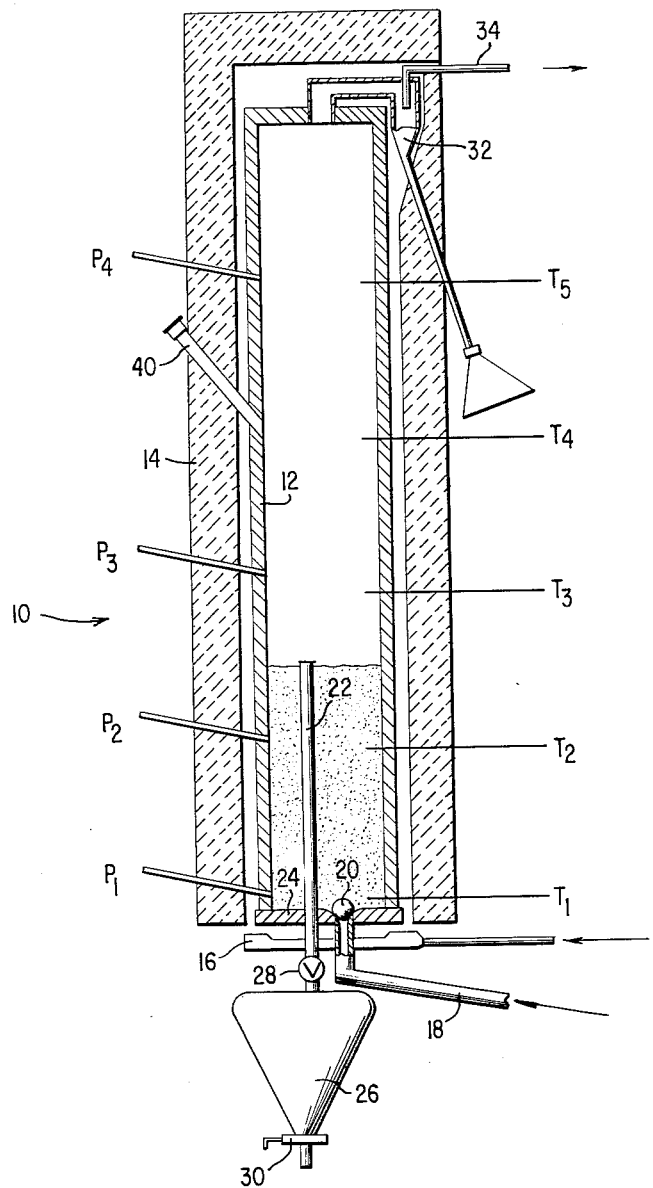

3,227,521
PROCESS FOR PRODUCING SUBSTANTIALLY
KAPPA-PHASE ALUMINA
Val G. Carithers, Little Rock, Fredrick Earl Adkins, Jr., and Alfred Lippman, Jr., Benton, and Damon V. Royce, Jr., and Kizhakke G. Hrishikesan, Little Rock, Ark., assignors to Reynolds Metals Company, Richmond, Va., a corporation of Delaware
Filed Jan. 17, 1961, Ser. No. 83,321
1 Claim. (Cl. 23—142)

This invention relates to an alumina material having specific abrasive, cleaning and other characteristics which make it uniquely effective in dentifrices, and to a method for its production. More particularly, the method of the invention concerns the thermal conversion of hydrated alumina by controlled dehydration to produce an intermediate alumina which on further calcination produces substantially anhydrous transition alumina, the predominant crystalline phase of which is kappa-alumina.

The thermal decomposition of the various alumina hydrates produces a number of crystalline or polymorphic variations of alumina which represent transition stages or phases in a sequence eventually yielding alpha-alumina. Various methods (such as X-ray diffraction analysis) have led to recognition of seven major categories of these crystalline alumina modifications, which have been designated arbitrarily as alpha-, gamma-, delta-, eta-, theta-, kappa-, and chi-alumina.

The hydrates of alumina which may serve as starting materials in the preparation of these crystalline alumina phases include the alpha- and beta-trihydrates of alumina, and the alpha- and beta-monohydrates of alumina, but not all of these are capable of yielding kappa-alumina.

Alumina alpha-trihydrate, $Al_2O_3 \cdot 3H_2O$ is found in nature as the mineral gibbsite, the principal constituent of North and South American bauxites. It is also made artificially by seeding and auto-precipitation in the Bayer process. Alumina beta-trihydrate (bayerite) is unstable and is not found in nature, but is produced by rapid precipitation from sodium aluminate solution. Both of these trihydrates can lose water at comparatively low temperatures with formation of alumina alpha-monohydrate.

Alumina alpha-monohydrate, also called boehmite, is the principal constituent of the bauxites found in Europe. Alumina beta-monohydrates is the mineral diaspore and is identical in composition with boehmite, but has a higher hardness and sepcific gravity.

Each of the above alumina hydrates behaves differently upon heating. In the case of gibbsite, it has been found that either chi-alumina or boehmite, or both, may be formed as dehydration proceeds. The proportion of each is dependent upon particle size of the initial hydrate, rate of dehydration, and the pressure of treatment, to mention the predominant factors. For example, the extremely slow dehydration (at about 200° C.) of Bayer-process trihydrate (particles substantially 50–325 mesh), at atmospheric pressure, yields both boehmite and chi-alumina. Yet the dehydration of very fine crystals (0.1 micron) of alpha-trihydrate, under identical conditions, produces chi-alumina, completely free of boehmite.

In practice, therefore, the dehydration of gibbsite yields a product which is usually a mixture of chi-alumina and boehmite. Subsequent calcination of the mixture gives rise to two series of the substantially anhydrous aluminas. In one, any gamma-alumina which is formed from the boehmite passes into delta-alumina, theta-alumina, and thence directly to alpha-alumina. The series commencing with chi-alumina passes into kappa-phase alumina, and ultimately also to the alpha-phase.a It is the transition alumina formed prior to alpha-phase development, having kappa-alumina as the predominant crystalline component in an amorphous matrix, which has appropriate properties for use as a dentifrice base. It is accordingly desirable to conduct the dehydration of alumina hydrates in such manner that the formation of kappa-alumina is optimized and the formation of other phases is controlled to the desired degree.

The transition aluminas produced from gibbsite exhibit a wide range of properties, including varying degrees of abrasiveness, brightness, adsorptive capacity and surface area which, combined with their chemical inertness, make them particularly suitable for such applications as dentifrices. Thus far, however, such aluminas have found insignificant use in dentifrices, principally because the optimum combination of properties has not been attainable. For example, if the alpha-alumina content is above about 4% (in the transition alumina formed by thermal decomposition of gibbsite), the abrasion on tooth enamel has been found to be excessive. Also, it has been found that the cleaning power (ability to remove dull protein film) is too low if the kappa-alumina is present in excess of about 60%. Conversely, a kappa content much below 25% generally results in excessive dentin abrasion, which is likewise prohibitive.

Furthermore, transition alumina normally contains varying amounts of amorphous material, i.e. alumina which is unidentifiable by X-ray analysis as a particular phase. Too great an amorphous content is found to cause excessive absorption of liquid ingredients in dentifrice formulae, thereby causing "chalking." Another undesirable effect of excessive amorphous alumina is the possible adsorption of flavoring ingredients, which reduces the appeal of the dentifrice.

In addition to the difficulties already mentioned gibbsite typically contains about 0.30–0.50% soda as $Na_2O$, which tends to produce an alkaline reaction. Excess alkalinity not only might adversely react with and affect the flavoring and vehicle of the paste, but also could attack the containers, especially in hot climates. As $Na_2O$ is more readily released from amorphous alumina, the quantity of such material must be controlled in order to reduce the deleterious effects of alkalinity.

For some dentifrice applications, the alumina material must have a pH of 7 or less by a test which comprises adding 10 grams of the prepared alumina to 100 ml. of 0.01 molar $H_3PO_4$ solution and shaking for one hour, then centrifuging and determining the pH of the supernatant liquor with a standard Beckman pH meter. For other dentifrice formulations, it is desirable to remove soda, as hereinafter described.

Advantageously, the alumina should be at least as white as other dentifrice abrasives.

Furthermore, the alumina must exhibit all the necessary properties after it is ground to a rather narrow range of particle size, substantially all under 20 microns but preponderantly above 2.5 microns. The complexity of producing an acceptable material is further realized when it is considered that grinding itself affects many of the essential properties of the alumina, such as evolution of soda, absorptivity and adsorptivity, cleaning and polishing power, and abrasiveness to dentin.

In summary, it is necessary not only to produce a product of certain aforementioned characteristics in crystal phases, but also to have the amorphous phases so constituted as to yield a generally satisfactory material after appropriate grinding. To some extent there are contravening factors; for instance, grinding generally reduces dentin abrasion, but it also tends to increase pH and absorptivity.

Therefore, the production of a thoroughly satisfactory alumina dentifrice has required unique, novel and unpredictable dehydration procedures and comminution techniques. There has been produced, however, in accordance with the invention, a dentifrice base having a new order of effectiveness. The material has superior cleaning and polishing power; reduced abrasiveness on dentin and enamel; increased whiteness; reduced absorptivity of liquids and reduced adsorptivity of flavors; and low pH. It is devoid of grittiness, and unreactive with other conventional toothpaste components.

Perhaps the most significant of those properties is the polishing power. Polishing power is particularly desirable in dentifrice because it promotes a surface devoid of projections and irregularities which would otherwise accumulate deposits, and the tooth surface is thereby less susceptible to staining. In terms of an arbitrary scale, based upon the reflectance obtained on teeth brushed with a machine under identical mechanical conditions, the polishing power of the kappa alumina material of the invention is 3 to 4, compared to conventional agents which range from about 1 to 2.

Another important consideration is dentin abrasion. This factor is particularly important for persons of advancing age because the gum progressively recedes, exposing more and more dentin. Low dentin abrasion of a dentifrice assures longer life to the teeth. It is estimated, for instance, that for every three teeth lost by cavities, there are ten lost for reasons such as tartar accretion, gum troubles, dentin and enamel abrasion, and related conditions. It is significant, therefore, that the present alumina combines high polishing power with a low dentin abrasion characteristic.

The present teaching provides a novel method for the preparation of an alumina material having kappa-phase as its principal crystalline component. The resulting product is substantially free of alpha-alumina, and contains a minimum of theta-alumina. Furthermore, a modified method is taught for the preparation of such a material which is also substantially free of sodium oxide.

In accordance with this invention, an alumina material having substantial kappa-alumina content is prepared by a two-step method which comprises first slowly dehydrating alumina trihydrate by heating at a temperature up to about 400° C., and then calcining the product of the first step at a temperature in the range for kappa-alumina conversion (i.e. about 900–1100° C.).

The method may be carried out by treating the hydrate in the form of a monolayer at a temperature of about 300–320° C., followed by calcining at about 1000–1100° C. In the present circumstances, a "monolayer" is defined to be a bed of material having an average depth corresponding approximately to the average particle size of the material. For production of commercial quantities, however, it is preferable to employ a fluosolids reactor wherein stable conditions may be continuously maintained. In that case, the fluidized hydrate is heated at a temperature between about 250° C. and about 350° C. (preferably about 250–320° C.) to form a partially dehydrated intermediate alumina. The intermediate is then calcined in a similar manner at a temperature between about 950° C. and about 1050° C. (preferably about 1000–1020° C.) to accomplish the kappa-phase conversion.

The yield of kappa-alumina has been found to be responsive to the particle size of the initial hydrate. Relatively coarse particles, especially 50 to 325 mesh size, are recommended to produce material having about 30% to about 45% kappa.

The characteristics of the intermediate hydrate may be controlled by the time/temperature relationship within the stated temperature limits. Furthermore, the rate of dehydration may be effectively controlled by the introduction of water vapor during the first step of the method. As used herein, "specific humidity" is defined as the ratio:

$$\frac{\text{Weight of water in atmosphere}}{\text{Weight of water + weight of air}}$$

The complex effect of steam on the thermal transformations of alumina hydrates has been partly recognized in the art, and it has been the general belief that steam increases the decomposition temperature of the hydrated phases. It was therefore both surprising and unexpected to discover, in accordance with this invention, that the decomposition of the hydrated phases (partial dehydration to intermediate phases) could be effectively and rapidly carried out at substantially lower temperatures than previously considered necessary.

It was also surprising and unexpected to discover, in accordance with this invention, that the addition of moisture to the hydrated alumina during decomposition enhanced the kappa-alumina yields, whereas the general belief in the art had been that such moisture tended to favor formation of rehydrated products (such as boehmite) which do not form kappa-alumina on calcination.

The dehydration of alumina hydrates, in accordance with this invention, may be carried out in any suitable equipment which permits the maintenance of a monolayer of the hydrate or its equivalent, but a fluosolids reactor is preferred for large volume production. Also satisfactory are an indirectly heated rotary kiln, and a direct-heated rotary kiln having an externally combustion chamber.

For a better understanding of the invention and its various objects, advantages and details, reference will be made to the present preferred apparatus for practicing the invention, shown in the accompanying drawing.

In the drawing:

FIGURE 1 is a vertical cross-section of an apparatus suitable for carrying out the method of the invention.

Referring now to FIG. 1, there is shown a fluid bed reactor 10, consisting of a stainless steel tube 12, mounted vertically inside an insulation-type fire brick chimney 14. Several ways are provided to introduce heat into the reactor. The principal heat source for higher temperatures is multiple Maxon burners 16, supplied with fuel by a ring manifold as shown. Heat may also be introduced by passing preheated gas into the reactor pipe 18 through which the bed feed also passes, thereby also preheating the feed; or by direct combustion of gas in the bed, the gas being introduced through pipe 18 along with air and feed.

Fluidizing agents (air, hot combustion gases, etc.) enter the bottom of the reactor through pipe 18. Ball check 20 prevents the solids from escaping when the flow of fluidizing agent is interrupted.

Continuous feed is accomplished through the pipe 18, conveyed by means of the fluidizing agent. Instrumentation includes manometers which are connected to pressure taps ($P_1$–$P_4$), and a pyrometer which is connected through a multipoint switch to the thermocouples ($T_1$–$T_5$).

Reacted solids are discharged as "overflow" through the vertical overflow pipe 22, which extends upward through the flanged bottom plate 24 and establishes the desired depth of bed in the reactor. A gas-tight receiver 26, valved at 28 and 30, is used to collect the overflow product.

Dust carried out of the reactor by the exhaust gas is collected in a system which includes a cyclone 32 mounted on top of the reactor and within the brick chimney. A woven glass sock (not shown) is attached to the end of the delivery pipe 34.

The bottom plate 24, which supports the inlet pipe 18, overflow connection 22, and a drain pipe (not shown) for emptying the reactor, is attached by a flange connection to the vertical reactor tube so that the whole assembly can be easily removed for cleaning and inspection.

The inlet pipe 40 is provided for batch or top feeding of the reactor and is sealed with a screw cap to avoid leakage.

The preparation of high purity alumina having kappa-phase as its principal crystalline component, in accordance with this invention, is illustrated by the following examples, but the invention is not to be considered as limited thereto.

EXAMPLE 1

Alumina alpha-trihydrate having a particle size of substantially 50 to 325 mesh (U.S. Standard) is distributed on an aluminum sheet so as to approximate a monolayer, and the sheet is placed in a furnace at 300–320° C. A controlled specific humidity (see Table I) is maintained in the furnace throughout the treatment, as by the introduction of steam. After an exposure of about 15 minutes in the furnace, the partially dehydrated intermediate alumina is transferred to a platinum crucible (wherein a monolayer is again approximated) and fired in a muffle furnace at about 1100° C. for 10–15 minutes. This calcination results in rapid formation of kappa-alumina, with substantially no development of alpha-alumina.

The influence of humidity during the preliminary dehydration step is shown in the following table:

Table I

EFFECT OF HUMIDITY ON ULTIMATE ANHYDROUS PHASE PRODUCTION

| Avg. Specific Humidity (percent) | Alumina Phases of Fired Product | | |
|---|---|---|---|
| | Kappa (percent) | Alpha (percent) | Theta (percent) |
| 4 | 15 | (*) | 13 |
| 33 | 43 | (*) | 7 |
| 66 | 48 | (*) | 5 |
| 82 | 54 | (*) | 7 |
| 89 | 80 | (*) | 8 |

NOTE.—In the tables, (*) indicates none detectable.

EXAMPLE 2

In a manner similar to Example 1, a monolayer of hydrate on an aluminum sheet is placed in a furnace at 150° C., the temperature is raised to 400° C. (at a rate of approximately 2½° C. per minute), and the sample is retained at about 400° C. for one hour.

When such a dehydration step is conducted in ambient atmosphere (no additional moisture added), the resulting fired product contains about 28% kappa alumina. However, a yield as high as about 59% kappa is attainable when steam is introduced into the furnace during dehydration.

Similarly, when a monolayer of hydrate is heated for one hour in a furnace already at 400° C., with steam as above, the yield of kappa on firing is reduced to about 36%.

EXAMPLE 3

A suitable intermediate alumina for kappa production may also be prepared by dehydrating alumina trihydrate in beds. Samples of hydrate as in Example 1 are placed in platinum crucibles to various bed depths. The crucibles are placed in a cup furnace at a temperature of about 400° C. Subsequently, the samples are fired at about 1000° C. to accomplish kappa conversion.

Optimum dehydration times for specified bed depths are given in Table II.

Table II

RELATIONSHIP BETWEEN TIME OF TREATMENT (@ 400° C.) AND DEPTH OF HYDRATE BED

| Bed depth, in.: | Optimum dehydration time, min. |
|---|---|
| 0.5 | 60–90 |
| 1.0 | about 120 |
| 3.0 | about 135 |
| 6.0 | 200–240 |

EXAMPLE 4

A satisfactory intermediate may also be prepared by dehydration in an indirectly fired rotary kiln. Samples of hydrate as in Example 1 are placed in a laboratory tube furnace. The furnace is elevated at one end, in order to retain each sample at the lower end where the temperature is accurately controlled. The controlled-heat zone is 12–14 cm. in length, the tube has an inside diameter of 1 inch, and preheated air (205° C.) is passed into the lower end of the tube. The tube containing a sample is placed in a preheated furnace (320–340° C.); the air flow is initiated at a rate of about 0.14 cu. ft. per minute (standard conditions); and the tube rotated throughout the dehydration treatment. Two sets of operating conditions, and the resulting products, are summarized below:

| | Operating Conditions | | Analyses of Product | | |
|---|---|---|---|---|---|
| | Tube, r.p.m. | Dehydration Time (Minutes) | Loss on Ignition (percent) | Boehmite (percent) | Gibbsite (percent) |
| (a) | 5 | 45 | 9.44 | 14 | (*) |
| (b) | 10 | 30 | 8.19 | 14 | 1–2 |

Upon subsequent calcination, kappa yields of about 60% were obtained with the above intermediates.

Once a suitable precursor alumina is achieved, there is considerable latitude in the effective parameters of the subsequent calcination step. The following example is illustrative.

EXAMPLE 5

In a manner similar to Example 3, intermediate alumina is prepared in a 0.5-inch bed, by heating at about 400° C. The product is capable of yielding, upon calcination, as much as 75–80% kappa. For this reason, such a product is useful in magnifying the effect of calcination upon the resulting phase productivity.

The influence of firing temperature and time of treatment is shown in Tables III and IV. Table III concerns bed calcination (0.5-inch bed), whereas Table IV concerns monolayer calcination.

Table III

EFFECT OF CALCINATION ON PHASE PRODUCTION FROM FROM BEDS OF SUITABLE INTERMEDIATE ALUMINA

| Firing Temp. (° C.) | Retention Time (minutes) | Resultant Product | |
|---|---|---|---|
| | | Kappa (Perent) | Alpha (Percent) |
| 850 | 90 | Trace | (*) |
| 900 | 90 | 17 | (*) |
| 900 | 150 | 25 | ~1 |
| 950 | 120 | 39 | (*) |
| 1,000 | 30 | 65 | (*) |
| 1,000 | 60 | 80 | (*) |
| 1,050 | 30 | 75 | Trace |
| 1,050 | 60 | 80+ | ~2 |
| 1,100 | 15 | 75 | ~1 |
| 1,100 | 60 | 80+ | ~10 |

Table IV
EFFECT OF CALCINATION ON PHASE PRODUCTION FROM MONOLAYERS OF SUITABLE INTERMEDIATE ALUMINA

| Firing Temp. (° C.) | Retention Time (Minutes) | Resultant Product | | |
|---|---|---|---|---|
| | | Kappa (Percent) | Alpha (Percent) | Theta (Percent) |
| 1,000 | 5 | 12 | (*) | |
| 1,000 | 15 | 37 | (*) | |
| 1,000 | 45 | 65 | (*) | |
| 1,000 | 60 | 77 | Trace | |
| 1,100 | 5 | 60 | (*) | 6 |
| 1,100 | 10 | 73 | (*) | 6 |
| 1,100 | 15 | 72 | (*) | 6 |
| 1,100 | 30 | 74 | (*) | 7 |

Thus, in summation of the preceding examples, the initial dehydration step to produce a satisfactory intermediate precursor for kappa-alumina may be effectively carried out by heating the hydrate at low temperatures (up to about 400° C.). The exposure time, when utilizing an approximate monolayer, need be only a matter of minutes; and specific humidity serves as a convenient control to achieve the necessary slow dehydration for ultimate high-kappa yield. Similarly, the monolayer calcination step requires about 30 minutes at 1000° C., or only about 5 minutes at 1100° C., for kappa yields in excess of 50%.

In accordance with another aspect of the invention, kappa-alumina having a very low soda content (in the order of 0.10% or less) is obtained either by supplemental treatment of the partially dehydrated intermediate alumina, or by treating the calcined final product. The following examples are illustrative.

EXAMPLE 6

A 10 gram portion of the intermediate alumina, such as that obtained in Example 4, is added to 150 ml. of 0.005% aqueous solution of Aerosol C-61 maintained at 90-95° C. The slurry thus formed is agitated (as by stirring) for 30 minutes at that temperature, and then filtered by suction. The resulting residue is washed with 150-200 ml. of hot distilled water, then dried and analyzed for $Na_2O$.

Another similar sample was likewise treated with 150 ml. of a 1% HCl solution.

The alumina materials so treated both showed a range of soda content reduced from 0.28% to 0.04-0.10%. In addition, neither treatment had appreciable effect upon the ultimate kappa formation.

EXAMPLE 7

Twenty grams of alumina having 87% kappa and 0.21% $Na_2O$ is bomb digested at 400° F. for 30 minutes with 150 ml. of 0.005% aqueous solution of Aerosol C-61 detergent; filtered; washed with 200 ml. hot water; dried; and analyzed for $Na_2O$ content and for kappa-alumina.

A second similar sample was likewise treated with distilled water; and another was treated with a 1.5% solution of $AlCl_3 \cdot 6H_2O$.

The results are shown in Table V.

Table V

| | Digestion Medium | Analyses of Alumina Product | | |
|---|---|---|---|---|
| | | $Na_2O$ (Percent) | Kappa (Percent) | Alpha (Percent) |
| (a) | 0.005% Aerosol C-61 | 0.08-.09 | 84 | (*) |
| (b) | Distilled water | 0.07-.10 | 88 | (*) |
| (c) | 1.5% $AlCl_3 \cdot 6H_2O$ | 0.08-.10 | 87 | (*) |

On the basis of the foregoing result, the feasibility of fluosolids techniques was indicated. Additional examples follow, illustrating the present preferred practice of the invention in conjunction with the apparatus shown in FIGURE 1.

EXAMPLE 8

Nine pounds of gibbsite having a particle size range of substantially 50 to 325 mesh (U.S. Standard) was charged to the reactor (see FIG. 1) through the batch feed pipe, while passing air upward through the reactor at 0.5 cubic feet per minute (standard conditions). The reactor tube had a 4-inch inside diameter and was 9 feet long, and the height of the vertical overflow pipe within the reactor tube was 40 inches.

The reactor was then heated by the external burners until the bed temperature $T_2$ reached 285° C., requiring about 30 minutes. Gibbsite was then continuously bottom fed to the reactor, by means of a pressurized table feeder, at a rate of 9.16 pounds per hour. Concurrently, the air supply was increased to 2.55 cubic feet per minute (standard conditions), equivalent to 1.0 foot per second linear space velocity in the reactor at reactor temperature of 300° C., and water as a fine spray was introduced at the rate of 14-15 cc./min. through pipe P-2 about 6 inches above the bottom of reactor. Temperature was maintained between 300 and 302° C. at $T_2$ throughout the rest of the first stage dehydration step. Stable, continuous operating conditions were established after 18.32 lbs. gibbsite had been fed to the reactor over about two hours, with the bed temperature, water addition, and the space rate remaining constant. Up to this point, all the "overflow" product and the cyclone and sock "carryover" were discarded. Thereafter, the products were collected as regular products. This stabilized process was continued until 231.85 pounds of overflow product had been collected. The product was sealed in an air tight drum for use as feed in the second stage on the thermal decomposition process.

In the second stage of the operation, 9 pounds of the product from stage one were charged into the reactor through the batch feed pipe while air was passing upward through the reactor at 0.5 cubic feet per minute (standard conditions). The height of the vertical overflow pipe was again 40 inches. The reactor was then heated by external burners for about 1-1½ hours, until the temperature of the fluidizing bed reached 1000° C. Additional product from the first stage was then continuously fed by the same procedure as in stage one at the rate of 9.30 lbs. per hour and the air supply was similarly increased to 1.0 foot per second linear space velocity inside the reactor (calculated at reactor temperature of 1020° C.). The bed temperature was then raised to 1020° C. at $T_2$ and maintained at that temperature for remainder of the operation. In this second stage, no water was added to the reactor.

Stability was considered to be established after 18.12 lbs. of material had been fed to the reactor in about 2 hours, maintaining the space velocity and temperature constant. The product was discarded until stable conditions were established, then it was collected as in the previous stage. The operation was continued until about 91 lbs. of "overflow" product were collected. The operating data for both stages are summarized in the following table.

Table VI

| Operating Data | Stage One | Stage Two |
|---|---|---|
| Feed rate (lbs./hour) | 9.60 | 9.30 |
| Bed depth (inches) | 40 | 40 |
| Bed temp. (° C.) at $T_2$ | 300-302 | 1020 |
| Space Velocity at Temp. $T_2$ (linear feet/sec.) | 1.0-1.1 | 1.0 |
| Water Addition Rate (cc./min.) | 14-15 | None |
| Retention time of solids in the reactor* (Minutes) | 110 | 90 |
| Weight of bed (pounds) | 9.7 | 8.7 |

*Note.—Retention time was computed as the quotient:

$$\frac{\text{Weight of fluidized bed (lbs.)}}{\text{Rate of product overflow (lbs. per minute)}}$$

The product from stage two was then ground in a Majac pulverizer with classifier to produce final product. The physical properties of the intermediate product from stage one, and the final product from stage two after Majac grinding, are given in Table VII.

Table VII

PROPERTIES OF INTERMEDIATE (CRYSTAL PHASE BY X-RAY)

| | |
|---|---|
| Gibbsite | 3–8% by weight. |
| Boehmite | Present. |
| Chi-alumina | Present. |
| Amorphous | Predominant. |
| Loss on ignition at 1000° C. | 13.85 to 16.59%. |
| Surface area (X-ray method) | 215–250 m.$^2$/g. |

PROPERTIES OF THE FINAL PRODUCT (CRYSTAL PHASE BY X-RAY)

| | |
|---|---|
| Kappa alumina | 40% by weight. |
| Theta alumina | 0% by weight. |
| Alpha alumina | 2–4% by weight. |
| Loss on ignition at 1000° C. | 0.77%. |
| Surface area (X-ray method) | 55 m.$^2$/g. |
| Absolute density | 3.493 g./cc. |
| Refractive index | 1.68–1.70. |
| Reflectance (photovolt reflectance meter; MgCO$_3$ standard) | 93 to 94%. |
| Moisture adsorption at 80% relative humidity | 1 hour 1.53%; 3 hours 1.68%; 15 hours 1.78%. |
| pH | 6.72. |
| Particle size (Andreasen pipette method): | |
| Plus 20 Microns | 0.1% by weight. |
| 20 x 10 Microns | 6.4% by weight. |
| 10 x 5 Microns | 22.4% by weight. |
| 5 x 2.5 Microns | 20.2% by weight. |
| —2.5 Microns | 50.9% by weight. |

The following dentifrice properties were reported on this material:

| | | Good Standard |
|---|---|---|
| Dentin abrasion | 354 | Below 500. |
| Enamel abrasion | 1,530 | 1,500±500. |
| Cleaning power | 7.5 | Above 7. |
| Paste formulation | Excellent | |
| Brightness | do | |
| Compatibility with other ingredients | do | |

EXAMPLE 9

By following a procedure substantially as given in Example 8, but using no water in stage one and slightly varying the temperature and retention time, a product was made which also had satisfactory dentifrice properties. The operating data, physical properties of the intermediate, final product and the dentifrice properties are given below:

Table VIII

| Operating Data | Stage One | Stage Two |
|---|---|---|
| Feed rate lbs./hr | 8.2 to 8.9 | 9.1 |
| Bed depth (inches) | 41 | 41 |
| Bed temperature (° C.) at T$_2$ | 280–290 | 1,001–1,030 |
| Space velocity at temp. of T$_2$ (linear ft./sec.) | 1.0 | 1.0 |
| Water addition rate (cc./min.) | None | None |
| Retention time of solids in the reactor (min.) | 96–118 | 80 |
| Weight of bed in lbs. | 9.4 | 7.9 |

Table IX

PROPERTIES OF INTERMEDIATE (CRYSTAL PHASE BY X-RAY)

| | |
|---|---|
| Gibbsite | 5 to 10% by weight. |
| Boehmite | Present. |
| Chi-alumina | Present. |
| Amorphous | Predominant. |
| Loss on ignition at 1000° C. | 11.43 to 13.30%. |
| Surface area (BET method) | 269. |
| Moisture adsorption at 50% relative humidity | 1 hour 5.69–6.78%. 3 hours 9.95–10.37%. |

PROPERTIES OF THE FINAL PRODUCT (CRYSTAL PHASE BY X-RAY)

| | |
|---|---|
| Kappa alumina | 34% by weight. |
| Theta alumina | 4% by weight. |
| Alpha alumina | 4–6% by weight. |
| Loss on ignition at 1000° C. | 0.39%. |
| Surface area (X-ray method) | 42 m.$^2$/g. |
| Absolute density | 3.59 g./cc. |
| Refractive index | 1.68 to 1.70. |
| Reflectance | 92.5 to 93%. |
| Moisture adsorption at 80% relative humidity | 1 hour 1.84%; 3 hours 1.98%; 15 hours 2.16%. |
| pH | 6.38. |
| Particle size (Andreasen pipette method): | |
| Plus 20 Microns | 1.4% by weight. |
| 20 x 10 Microns | 5.4% by weight. |
| 10 x 5 Microns | 28.8% by weight. |
| 5 x 2.5 Microns | 24.1% by weight. |
| —2.5 Microns | 40.3% by weight. |

The following dentifrice properties were reported on this material:

| | |
|---|---|
| Dentin abrasion | 456. |
| Enamel abrasion | 2030. |
| Cleaning power | 8.0. |
| Paste formulation | Excellent. |
| Brightness | Do. |
| Compatibility with other ingredients | Do. |

It is obvious from the above results that the material produced in Example 9 is satisfactory in all respects except for a slightly excessive enamel abrasion characteristic due to high alpha alumina content. The alpha alumina content is reduced satisfactorily by reducing the temperature of second stage calcination to about 1020° C., as was done in Example 8.

EXAMPLE 10

An experiment was performed in which 0.10 to 0.15 c.f.m. of natural gas was introduced directly to the bed together with 1.0 s.c.f.m. air. The hydrate feed was similar to the intermediate obtained under conditions of stage one, Example 8. The operating conditions for stage two, Example 9, were followed in this test. The quantity of gas fed into the reactor was only enough to partially supply the heat requirement for calcination. The product showed a kappa-alumina content of 40%, and alpha-alumina 1–3%. It is obvious from the results obtained that this type of heating is not detrimental to the proper development of the right transition alumina material for dentifrice application.

The heat evolved from the burning gas is instantly absorbed by the whole mass of rapidly moving solids, and the total surface area is sufficient to keep a low flame temperature and to avoid overheating.

EXAMPLE 11

To test the conditions of two-stage calcination, another experiment was conducted. Intermediate material produced under conditions of stage one, Example 8, was first calcined in the fluid-bed reactor at a temperature of 495–500° C. for a retention time of 76 minutes. This material was then calcined further at 1020° C. under the conditions of stage 2 of Example 3. The product showed kappa 42%, alpha 3%, thus indicating that the calcination step may be performed in two stages to produce essentally the same phases.

EXAMPLE 12

An experiment was conducted in which the intermediate produced under conditions of stage one, Example 8 was calcined in the fluid bed reactor at a temperature of 945–955° C. with a retention time of 5.3 hours. The product showed kappa 35% and alpha 2%, thus indicating that considerable flexibility of conditions is permissible in the calcination stage provided the right intermediate is employed.

It was also determined that preheating the raw material, gibbsite, which may be wet, up to 100° C. for as long as 24 hours, produced no detrimental effect on the intermediate or the final product when the dried material was subsequently treated according to the conditions in Example 8. This is to be expected because gibbsite does not start dehydrating below about 150° C. Since it is only the conditions of dehydration which are critical in producing a suitable transition alumina for dentifrice application, the gases from the dehydration step may be used without detriment for drying and preheating the gibbsite.

It has been determined that comminution procedures significantly influence the ultimate phase production. For example, grinding the intermediate alumina results in a lowered kappa content upon calcination, and tends to increase the formation of alpha-alumina. The following example is illustrative.

EXAMPLE 13

(a) Material such as that of Example 1 is dehydrated (½-inch bed; 1½ hours at 400° C.); subjected to grinding for 30 minutes; and fired at about 1000° C. for 1½ hours. The resulting product exhibits about 30% kappa, but more than 50% alpha.

(b) When the grinding, instead, follows calcining, the kappa yield is about 49% and the alpha content only about 3%.

(c) Similarly, when grinding precedes dehydration, the kappa yield is about 82% and no detectable alpha-alumina is formed.

It is apparent from the results of Example 13 that grinding before dehydration does not significantly hinder the ultimate development of high-kappa content. But grinding after dehydration is deleterious, at least as to increasing the alpha content.

For purposes of definition, the X-ray diffraction analyses of the various phases discussed herein are tabulated in Table X.

Table X

X-RAY DIFFRACTION DATA FOR TRANSITION ALUMINAS

| Theta | | Gamma | | Chi | | Kappa | |
|---|---|---|---|---|---|---|---|
| dA. | I | dA. | I | dA. | I | dA. | I |
| ------ | --- | ------ | ------ | ------ | ------ | 6.15 | 5 |
| 5.47 | 5 | ------ | ------ | ------ | ------ | ------ | --- |
| 4.57 | 15 | ------ | ------ | ------ | ------ | 4.50 | 5 |
| ------ | ---- | ------ | ------ | ------ | ------ | 3.16 | 5 |
| ------ | ---- | ------ | ------ | ------ | ------ | 3.06 | 12 |
| 2.866 | 55 | ------ | ------ | 2.848 | 8 | ------ | ---- |
| ------ | ---- | 2.796 | 6 | ------ | ------ | 2.813 | 20 |
| 2.739 | 70 | ------ | ------ | ------ | ------ | ------ | ---- |
| ------ | ---- | ------ | ------ | ------ | ------ | 2.585 | 40 |
| 2.468 | 70 | 2.423 | 30 | 2.404 | 15 | 2.404 | 25 |
| 2.326 | 50 | ------ | ------ | ------ | ------ | 2.321 | 15 |
| ------ | ---- | 2.281 | 20 | ------ | ------ | ------ | ----- |
| 2.264 | 35 | ------ | ------ | ------ | ------ | ------ | ----- |
| ------ | ---- | ------ | ------ | 2.126 | 15 | 2.127 | 30 |
| 2.030 | 50 | ------ | ------ | ------ | ------ | ------ | ----- |
| ------ | ---- | 1.993 | 55 | ------ | ------ | ------ | ----- |
| ------ | ---- | 1.949 | 25 | ------ | ------ | ------ | ----- |
| 1.914 | 25 | ------ | ------ | 1.91 | 5 | 1.877 | 10 |
| 1.807 | 10 | ------ | ------ | ------ | ------ | 1.834 | 5 |
| 1.737 | 5 | ------ | ------ | ------ | ------ | 1.753 | 5 |
| ------ | ---- | ------ | ------ | ------ | ------ | 1.642 | 12 |
| 1.544 | 20 | 1.533 | 3 | ------ | ------ | ------ | ----- |
| 1.488 | 15 | ------ | ------ | ------ | ------ | ------ | ----- |
| 1.455 | 20 | ------ | ------ | ------ | ------ | 1.455 | 8 |
| 1.431 | 5 | ------ | ------ | ------ | ------ | 1.439 | 25 |
| 1.408 | 25 | 1.406 | 30 | ------ | ------ | ------ | ----- |
| 1.392 | 65 | 1.392 | 50 | 1.394 | 35 | 1.395 | 45 |

NOTE: Reticular distances (dA.), relative integrated intensities (I)

While certain present preferred modes of practicing the invention have been described, it will be recognized that the invention may be otherwise variously embodied and practiced within the scope of the following claim.

What is claimed is:

Method for the preparation of an alumina having from about 30% to about 45% by weight of kappa-phase alumina as its principal component, and not more than about 10% by weight of theta-alumina, comprising the steps of:

(a) partially dehydrating alumina trihydrate having an an average particle size between about 50 and 325 mesh by exposing it substantially instantaneously in fluidized form to a temperature between about 250° C. and about 350° C. and maintaining it at that temperature for a period between about 15 and about 240 minutes to form an intermediate mixture the crystalline phase of which consists essentially of chi-alumina and alpha-alumina monohydrate, and (b) calcining said intermediate mixture at a temperature between about 900° C. and about 1100° C. to effect phase transformation to kappa-alumina.

References Cited by the Examiner

UNITED STATES PATENTS

| | | | |
|---|---|---|---|
| 2,405,275 | 8/1946 | Stowe | 23—141 |
| 2,424,645 | 7/1947 | Baumann | 51—309 |
| 2,769,699 | 11/1956 | Polch | 51—309 |
| 2,876,068 | 3/1959 | Tertian et al. | 23—142 |
| 2,961,296 | 11/1960 | Fenerty | 23—142 |
| 3,003,919 | 10/1961 | Broge | 51—309 |

MAURICE A. BRINDISI, *Primary Examiner.*

JOHN R. SPECK, *Examiner.*